Oct. 20, 1925. 1,558,448
A. E. ANDERSON
AUTOMATIC RECLOSING CIRCUIT BREAKER SYSTEM
Filed Aug. 2, 1922
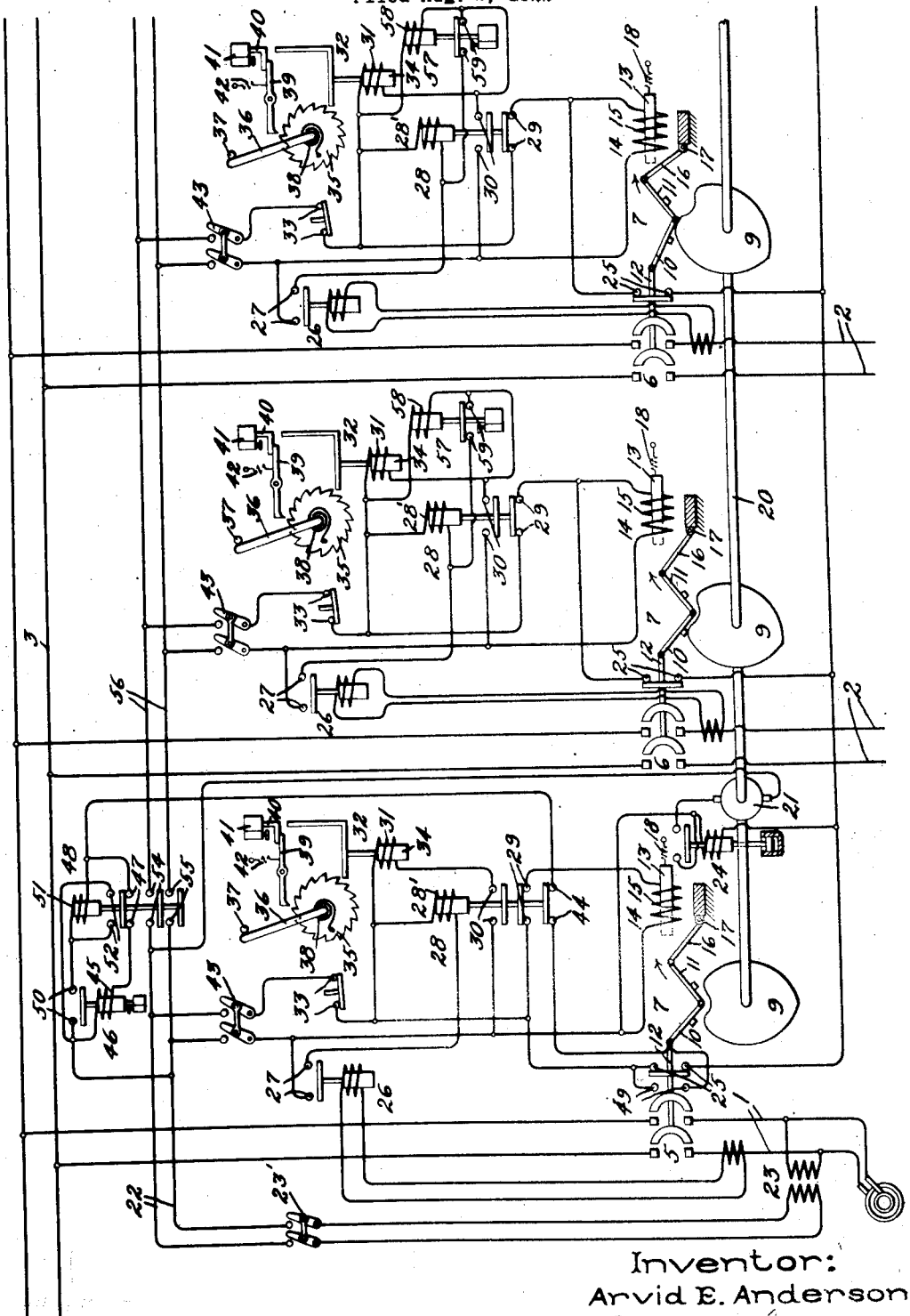
Inventor:
Arvid E. Anderson,
by
His Attorney.

Patented Oct. 20, 1925.

1,558,448

UNITED STATES PATENT OFFICE.

ARVID E. ANDERSON, OF SCHENECTADY, NEW YORK, ASSIGNOR TO GENERAL ELECTRIC COMPANY, A CORPORATION OF NEW YORK.

AUTOMATIC RECLOSING CIRCUIT-BREAKER SYSTEM.

Application filed August 2, 1922. Serial No. 579,252.

*To all whom it may concern:*

Be it known that I, ARVID E. ANDERSON, a citizen of the United States, residing at Schenectady, in the county of Schenectady, State of New York, have invented certain new and useful Improvements in Automatic Reclosing Circuit-Breaker Systems, of which the following is a specification.

My invention relates to automatic reclosing circuit breaker systems and particularly to such systems in which a plurality of circuit breakers are arranged to be closed automatically.

One object of my invention is to provide a new and improved automatic reclosing circuit breaker system of the above mentioned type, whereby the opening of one of a plurality of the circuit breakers effects the opening of the remaining circuit breakers which are automatically reclosed in succession after the circuit breaker, which caused the opening of all the circuit breakers, has been reclosed.

In a system of distribution, in which a supply circuit supplies current to a plurality of load circuits, and a circuit breaker with a low voltage release is provided in each circuit, a severe short circuit or overload on one or more of the load circuits may cause the circuit breaker in the supply circuit, as well as the circuit breaker in the overloaded circuit, to open so that all of the circuit breakers in all of the load circuits are opened and all of the load circuits are deenergized. Since it is very desirable that all of the load circuits whose load conditions are normal, should not be kept deenergized any longer than is necessary, it is evident that when all of the circuit breakers are opened due to a short circuit or overload on one or more of the load circuits, the circuit breaker should be reclosed in such a manner that all of the circuit breakers are not opened again when an overloaded circuit is reconnected to the supply circuit.

In accordance with my invention when all of the circuit breakers are opened due to a short circuit or overload on one of the load circuits, the circuit breaker in the supply circuits is automatically closed first and then the circuit breakers in the load circuits are automatically reclosed in succession. Due to the different settings of the overload relays controlling the opening of the circuit breakers, the probabilities are decreased in such an arrangement so that every time the circuit breaker in the overloaded circuit is reclosed the total load connected to the supply circuit is not great enough to cause the circuit breaker in the supply circuit to open.

My invention will be better understood from the following description taken in connection with the accompanying drawing, and its scope will be pointed out in the appended claims.

In the accompanying drawing which shows one embodiment of my invention a plurality of single phase alternating current circuits 1 and 2 are arranged to be connected to a common distributing bus 3 by means of the circuit breakers 5 and 6, respectively. As shown in the drawing, 1 is a supply circuit which supplies current to the distributing bus 3 and 2 are load circuits which receive current from the distributing bus 3. While I have shown only single phase circuits and only one supply circuit and two load circuits, it is to be understood however that my invention is not limited to any particular number of phases or to any particular number of circuits.

Each circuit breaker is provided with a suitable operating mechanism for closing the circuit breaker. The particular type of mechanism schematically shown in the drawing comprises an overset toggle 7 which is arranged to be set by a cam 9. Each toggle 7 comprises links 10 and 11 which act between the contact arm 12 of the circuit breaker and the core 13 of an electromagnet 14 when the coil 15 thereof is energized. The link 11 is pivotally connected to a link 16 which in turn is connected to the fixed pivot 17. The core 13 is so arranged with respect to the toggle 7 that when the coil is energized it is in the position shown by the dotted lines in the drawing and prevents the link 16 from rotating beyond a certain point in the direction indicated by the arrow so that when the circuit breaker is closed the force tending to open the breaker holds the toggle locked. When, however, the circuit breaker is closed and the coil 15 is deenergized a spring 18 moves the core 13 out of engagement with the link 16 to the position shown by the solid lines in the drawing so that the opening force of the circuit breaker causes the link 16 to rotate in the direction indicated by the arrow thereby breaking the toggle and allowing the circuit breaker to open regardless of the position of the cam 9.

When the coil 15 is deenergized and the circuit breaker is open the rotation of the cam 9 causes the link 16 to rotate about its fixed pivot 17 so that the circuit breaker remains open and the toggle 7 remains unlocked. When, however, the coil 15 is energized so that the core 13 is moved into the path of the link 16 the toggle 7 is straightened and the circuit breaker is closed when the cam 9 reaches its locking position.

The cams 9 are mounted on a common shaft 20 which may be driven by any suitable means, such as an electric motor 21. Preferably, the cams are mounted on the shaft so that the circuit breakers are closed in succession with a predetermined time between the closing of any two breakers. With such an arrangement a motor which is large enough to close only one circuit breaker may be used since only one circuit breaker is closed at a time.

It is to be understood that my invention is not limited to the mechanism shown in the drawing for closing the circuit breakers. The particular mechanism shown is claimed in the copending application, Serial No. 665,134 filed Aug. 1, 1923 by William K. Rankin, and assigned to the same assignee as this application.

The motor 21 is arranged to be supplied with current from any suitable source such as the control circuit 22 which is supplied with current from the supply circuit 1 by means of the transformer 23 and the manually controlled switch 23'.

The circuit of the motor 21 is controlled by the circuit breakers so that the motor operates to effect the operation of the operating mechanisms when any one of the circuit breakers is open. As shown in the drawing, the motor 21 is arranged to be connected across the control circuit 22 by means of a relay 24 the circuit of which is arranged to be completed by the contacts 25 of each circuit breaker when in its open position.

Each circuit breaker is arranged to be opened in response to an overload on the respective circuit by means of an overload relay 26 which is connected in the respective circuit. Each overload relay 26 is arranged so that it does not close its contacts 27 until the current in the respective circuit exceeds a predetermined value. Preferably, the overload relays are of the inverse time limit type.

Each overload relay 26 controls the circuit of the coil 28' of a control relay 28 associated therewith. Each control relay 28 is provided with contacts 29 which are in the circuit of the holding coil 15 of the respective circuit breaker so that whenever the control relay is energized the respective circuit breaker is opened. Each control relay 28 is also provided with contacts 30 which are in the circuit of the coil 31 of a notching relay 32 associated therewith. The notching relays 32 may be of any suitable construction whereby they do not open their contacts 33 until their coils 31 have been energized a predetermined number of times. As shown in the drawing, each notching relay 32 is arranged to open its contacts 33 when the coil 31 has been successively energized a predetermined number of times with less than a predetermined time between successive energizations thereof. The particular type of notching relay shown in the drawing comprises a core 34 which is arranged to engage a ratchet 35 carrying a movable actuating member 36 which is normally held against a stop 37 by a spring 38. The ratchet 35 is held in its actuated position by a holding pawl 39 which is normally held out of engagement with the ratchet by the movable member 40 of a time delay device such as a dash pot 41. The movable member 40 of the dash pot 41 is arranged to be operated by the core 34 when the coil 31 is energized. A spring 42 tends to move the holding pawl 39 into engagement with the ratchet 35. Preferably the dash pot 41 is arranged in any suitable manner so that only the downward movement of the movable member 40 is delayed. The contacts 33 of each notching relay are so arranged with respect to the actuating member 36 that these contacts are not opened until the coil 31 has been successively energized a predetermined number of times, which, in the arrangement shown in the drawing, is assumed to be three. These contacts are also arranged so that they remain in their open position until they have been reset by hand.

The circuits of the coils 15, 28' and 31 associated with each circuit breaker include the contacts 33 of the respective notching relay 32 so that when these contacts are open the relays cannot be energized although the respective circuit breaker is open. The circuits of the coils 15, 28' and 31 also include the contacts of a manually controlled switch 43 associated with each circuit breaker so that the reclosing equipment of any circuit breaker may be rendered inoperative by merely opening the respective switch 43.

The control relay 28 associated with the circuit breaker 5 in the supply circuit is provided with the contacts 44 which control the circuit of the coil 45 of a time relay 46. The circuit of the coil 45 which is arranged to be connected across the control bus 22 also includes the contacts 47 of a relay 48, auxiliary contacts 49 on the circuit breaker 5, contacts 33 of the respective notching relay 32 and contacts of the respective switch 43.

The time relay 46 is designed in any suitable manner so that it does not close its contacts 50 until a certain time after the coil 45 is energized. When the time relay 46 closes its contacts 50 it completes the circuit of the coil 51 of the relay 48. When the relay 48 closes its contacts 52 it completes a locking circuit for itself which is independent of the contacts 50 of the relay 46 so that the coil 51 remains energized after the contacts 50 open due to the circuit of the coil 45 being open at the contacts 47 of the relay 48. The circuit of the coil 51 also includes the contacts 44 of the control relay 28 associated with the circuit breaker 5, the auxiliary contacts 49, contacts 33 of the respective notching relay 32 and contacts of the respective switch 43. When the relay 48 closes its contacts 54 and 55 it connects the control circuit 22 to the control circuit 56 which supplies current to the reclosing equipment associated with the circuit breakers 6.

From the above description it is evident that the circuit breaker 5 has to be closed a certain time before any of the circuit breakers 6 can be reclosed. In order to prevent each circuit breaker 6 from being reclosed until a predetermined time after it has been opened by an overload upon the respective circuit, each circuit breaker is provided with a time relay 57, the coil 58 of which is arranged to be connected across the control circuit 56 when the respective overload relay 26 closes its contacts 27. Time relays 57 are designed in any suitable manner so that they do not open their respective contacts 59 until a predetermined time after the coils 58 are energized. The circuit of each coil 58, which is arranged to be connected in parallel with the coil 31 of the respective notching relay, includes contacts of the respective switch 43, the contacts 33 of the respective notching relay 32, contacts 30 of the respective control relay 28 and contacts of the respective switch 43.

The coils 28' of the control relays 28 associated with the circuit breakers 6 are arranged to be connected across the control circuit 56 when the respective overload relay 26 closes its contacts 27. When any one of the coils 28' is energized and the respective relay 28 closes its contacts 30 a locking circuit for the coil is completed through the contacts 30 and the contacts 59 of the respective time relay 58. This locking circuit is independent of the contacts 27 of the respective overload relay so that the coil 28' is not deenergized by the overload relay opening its contacts when the circuit breaker opens, but remains energized until the time relay 57 opens its contacts 59.

The operation of the equipment shown in the drawing is as follows: Let it be assumed that all of the circuit breakers are open and the supply circuit is energized. To close the circuit breakers, all of the switches 43 are closed and then the switch 23' is closed. The closing of the switch 23' energizes the control circuit 22 so that the holding coil 15 of the circuit breaker 5 and the coil of the motor relay 24 are energized. The energization of the motor relay 24 completes the circuit of the motor 21 which rotates the shaft 20 and the cams 9. Since the holding coil 15 of the circuit breaker 5 is energized this circuit breaker is closed as soon as the cam 9 associated therewith reaches its closing position. The circuit breakers 6 are not closed at this time because the holding coils 15 associated therewith are deenergized.

The opening of the auxiliary contacts 25 of the circuit breaker 5 when it closes opens the energizing circuit of the coil of the motor relay 24 so that the circuit of the motor 21 is opened. Although the coil of the relay 24 is connected across the control circuit 56 at this time by means of auxiliary contacts 25 on the open circuit breakers 6, this relay is not energized because the control circuit 56 is deenergized. As soon as the auxiliary contacts 49 of the circuit breaker 5 are closed the circuit for the coil 45 of the time relay 46 is completed and after a certain time this relay closes its contacts 50 thereby completing the circuit of the coil 51 of the relay 48. The closing of the contacts 52 of the relay 48 completes the heretofore traced locking circuit for the coil 51 and the closing of the contacts 54 and 55 connect the control circuits 22 and 56 together. As soon as the control circuit 56 is energized the holding coils 15 of all of the circuit breakers 6 are simultaneously energized and at the same time the coil of the motor relay 24 is energized so that the motor 21 begins to rotate. The circuit breakers 6 are then closed in succession, the particular circuit breaker to be closed first being dependent upon the position of the cams 9 when the holding coils 15 and the coil of the motor relay 24 are energized. After all of the circuit breakers have been closed so that all of the contacts 25 are open the motor relay 24 is deenergized and the motor 21 stops.

It is evident that by connecting the load circuits 2 to the distributing bus 3 in this manner the load on the supply circuit is gradually increased so that much better regulation can be maintained than if the total load were connected to the supply circuit at one time.

Let it now be assumed that a short circuit or overload occurs on one of the load circuits 2 and is so severe that it causes the overload relays 26 in both the overload circuit and the supply circuit to close their respective contacts 27. The closing of the contacts 27 completes the circuits of the coils 28' of the respective control relays 28.

The opening of the contacts 29 when the relays 28 are energized opens the circuit of the respective holding coils 15 so that the circuit breaker 5 and the circuit breaker 6 in the overloaded circuit are opened. The closing of the contacts 30 of the relays 28 completes the circuits of the coils 31 of the respective notching relays 32. The opening of the contacts 44 of the control relay 28 associated with the circuit breaker 5 opens the circuit of the coil 51 so that the relay 48 is deenergized and the control circuit 56 is disconnected from the control circuit 22. The deenergization of the control circuit 56 causes the deenergization of the holding coils 15 of all of the circuit breakers 6 so that all of these circuit breakers open. The relay 48 is designed, however, so that it does not open its contacts 54 and 55 until after the coil 31 of the notching relay associated with the overload circuit 2 has been energized and the notching relay has completed its notching operation.

As soon as the circuit breaker 5 opens the current through the overload relay 26 associated therewith decreases so that the relay opens its contacts 27 thereby opening the circuit of the coil 28' of the respective control relay 28. The relay 28 then opens its contacts 30 and closes its contacts 29 and 44. The closing of the contacts 29 completes the circuit of the holding coil 15 of the circuit breaker 5. The circuit breakers are then closed in the same manner as above described.

Unless the short circuit or overload is of a very severe character and is connected to the last load circuit 2 to be connected to the distributing bus 3, it is evident that due to the different settings of the inverse time limit overload relays 26 in the supply circuit and in the load circuits, the circuit breaker 5 in the supply circuit will not open in the great majority of cases when the circuit breaker 6 in the load circuit, to which the short circuit is connected is reclosed. The circuit breaker 6 in the overloaded circuit 2, however, will open as soon as the overload relay 26 in the overloaded circuit closes its contacts 27. The other circuit breakers 6, however, remain closed, since the load conditions on the respective circuits are normal and therefore the supply circuit will continue to supply current to these load circuits.

When the circuit breaker 6 in the overload circuit 2 opens the second time, the coil 31 of the respective notching relay 32 is again energized. Since the control circuit 56 is energized at this time the coil 28' of the control relay 28 associated with the open circuit breaker 6 remains energized and prevents the circuit breaker from reclosing until the respective time relay 57 opens its contacts 59. As soon as the time relay 57 opens its contacts 59 and causes the respective relay 28 to close its contacts 29 the holding coil 15 of the respective circuit breaker 6 and the motor relay 24 are energized so that the motor 21 rotates and closes the open circuit breaker 6.

If the overload or short circuit is still connected to the circuit 2 when the circuit breaker 6 is reclosed the circuit breaker opens a third time and effects the operation of the notching relay 32 associated therewith so that it opens its contacts 33 thereby rendering the reclosing equipment associated with the circuit breaker inoperative since it opens the circuits of the coils 28' and 31 thereof. Inasmuch as the circuit of the motor relay 24 through the contacts 25 of the open circuit breaker 6 is also open at the contacts 33 of the notching relay 32, the motor 21 does not operate, although the circuit breaker is open. The opening of any other circuit breaker, however, effects the operation of the motor 21 in the manner above described.

If the second reclosing of the circuit breaker 6 and the overloaded circuit 2 effects the opening of the circuit breaker 5 the operation of the reclosing equipments of all of the circuit breakers is the same as when the circuit breaker in the overloaded circuit opens the first time except that the circuit breaker 6 in the overload circuit is not reclosed because the contacts 33 of the notching relay associated therewith are open.

After all of the circuit breakers, except the one that has been locked out, have been reclosed a certain length of time, the movable members 40 of all of the dash-pots 41 move the holding pawls 39 out of engagement with the respective ratchets 35 so that movable members 36 of all of the notching relays are restored to their normal positions. The contacts 33 of the notching relay which is associated with the open circuit breaker 6, however, remain in their open position until they are reset by hand.

From the above description, it is evident that if the overload on load circuit 2 is not severe enough to open the circuit breaker 5 in the supply circuit, the circuit breaker 6 in the overload circuit 2 is reclosed two times with a certain interval between each closing and if the short circuit or overload is still connected to the load circuit when the circuit breaker is closed the second time, it opens a third time and the notching relay 32 associated therewith opens its contacts 33 and renders the reclosing means of the circuit breaker inoperative. If the circuit breaker should remain closed after either the first or second reclosing the notching relay 32 is restored to its normal position in a manner heretofore described.

Furthermore, it is evident that if for any reason the circuit breaker 5 in the supply circuit 1 is opened three times in succession with less than a predetermined time, which depends upon the setting of the dash pot 41, between successive openings all of the circuit breakers are locked open.

While I have shown and described one embodiment of my invention, I do not desire to be limited to the exact arrangement shown and described, but seek to cover in the appended claims all those modifications which fall within the true spirit and scope of my invention.

What I claim as new and desire to secure by Letters Patent of the United States, is:—

1. In an automatic reclosing circuit breaker system, a plurality of circuit breakers, means arranged to be operated to effect the opening of one of said circuit breakers means operative in response to the opening of said one of said circuit breakers to effect the opening of the other of said circuit breakers, means operative in response to the opening of said one of said circuit breakers to effect the closing thereof, means arranged to effect the closing of the other of said circuit breakers successively, and means operative in response to the closing of said one of said circuit breakers to effect the operation of said last mentioned means.

2. In an automatic reclosing circuit breaker system, a plurality of circuit breakers, means arranged to be operated to effect the opening of one of said circuit breakers, means operative in response to the opening of said one of said circuit breakers to effect the opening of the other of said circuit breakers, means operative in response to the opening of said one of said circuit breakers to effect the closing thereof, means arranged to effect the closing of the other of said circuit breakers successively, and means operative in response to the closing of said one of said circuit breakers to effect the operation of said last mentioned means after said one of said circuit breaker has been closed a predetermined time.

3. In an automatic reclosing circuit breaker system, a plurality of circuit breakers, means arranged to be operated to effect the opening of one of said circuit breakers, means operative in response to the opening of said one of said circuit breakers to effect the opening of the other of said circuit breakers, means operative in response to the opening of said one of said circuit breakers to effect the closing of said one of said circuit breakers, means arranged to effect the closing of the other of said circuit breakers successively, and means operative in response to the closing of said one of said circuit breakers to effect the closing of the other of said circuit breakers in a predetermined sequence with a predetermined time between the closing of successive circuit breakers.

4. In an automatic reclosing circuit breaker system, a plurality of circuit breakers, a holding coil for each circuit breaker arranged when energized to maintain the respective circuit breaker in its closed position, means arranged to be actuated to effect the deenergization of one of said holding coils to effect the opening of the respective circuit breaker, means operative in response to the opening of said last-mentioned circuit breaker to effect the deenergization of all of the other holding coils, means operative in response to the opening of said last mentioned circuit breaker to effect the closing thereof, and means operative in response to the closing of said last mentioned circuit breaker to effect the energization of the holding coils of the other circuit breakers after said circuit breaker has been closed a predetermined time.

5. In an automatic reclosing circuit breaker system, a plurality of circuit breakers, a coil associated with each circuit breaker arranged, when deenergized, to prevent the closing of the respective circuit breaker if it is open and to effect the opening of the respective circuit breaker if it is closed, means arranged to be actuated to effect the deenergization of one of said coils, means operative in response to the opening of the circuit breaker associated with said one of said coils to effect the deenergization of all of the other of said coils, means operative in response to the opening of the circuit breaker associated with said one of said coils to effect the closing thereof, means operative in response to the closing of the circuit breaker associated with said one of said coils to effect the energization of the holding coils of the other circuit breakers after the circuit breaker associated with said one of said coils has been closed a predetermined time and means adapted to be operated to close the other of said circuit breakers.

6. In an automatic reclosing circuit breaker system, a plurality of circuit breakers, a coil associated with each circuit breaker arranged, when deenergized, to prevent the closing of the respective circuit breaker if it is open and to effect the opening of the respective circuit breaker if it is closed, means arranged to be actuated to effect the deenergization of one of said coils, means operative in response to the opening of the circuit breaker associated with said one of said coils to effect the deenergization of all of the other coils, means operative in response to the opening of the circuit breaker associated with said one of said coils to effect the closing thereof, means arranged to effect the closing of the other of said circuit breakers in succession, and means operative in response to the closing of the circuit breaker associated with said one of said coils to effect the energization of the holding coils of said other circuit breaker after the circuit breaker associated with said one of said coils has been closed a predetermined time.

7. In an automatic reclosing circuit breaker system, a supply circuit, a plurality of load circuits, a distributing bus, a circuit breaker adapted to connect said supply circuit to said distributing bus, a plurality of circuit breakers each being adapted to connect one of said load circuits to said distributing bus, means operative in response to the opening of the circuit breaker between the supply circuit and the distributing bus to effect the opening of all of the circuit breakers between said load circuits and said distributing bus, means adapted to be operated to close the circuit breaker between the supply circuit and the distributing bus, and means operative in response to the closing of said last mentioned circuit breaker to effect the closing of said plurality of circuit breakers successively.

8. In an automatic reclosing circuit breaker system, a supply circuit, a plurality of load circuits, a distributing bus, a circuit breaker adapted to connect said supply circuit to said distributing bus, a plurality of circuit breakers each being adapted to connect one of said load circuits to said distributing bus, means operative in response to the opening of the circuit breaker between the supply circuit and the distributing bus to effect the opening of all of the circuit breakers between said load circuits and said distributing bus, means adapted to be operated to close the circuit breaker between the supply circuit and the distributing bus, means operative in response to the closing of said last mentioned circuit breaker to effect the closing of said plurality of circuit breakers successively, and means for preventing said last-mentioned means from effecting the closing of said plurality of circuit breakers until a predetermined time has elapsed after said circuit breaker between the supply circuit and said distributing bus closes.

In witness whereof, I have hereunto set my hand this 1st day of August, 1922.

ARVID E. ANDERSON.